Oct. 11, 1932.  R. A. JOHANNESSEN  1,881,632
DIRECTION INDICATOR
Filed Sept. 25, 1930
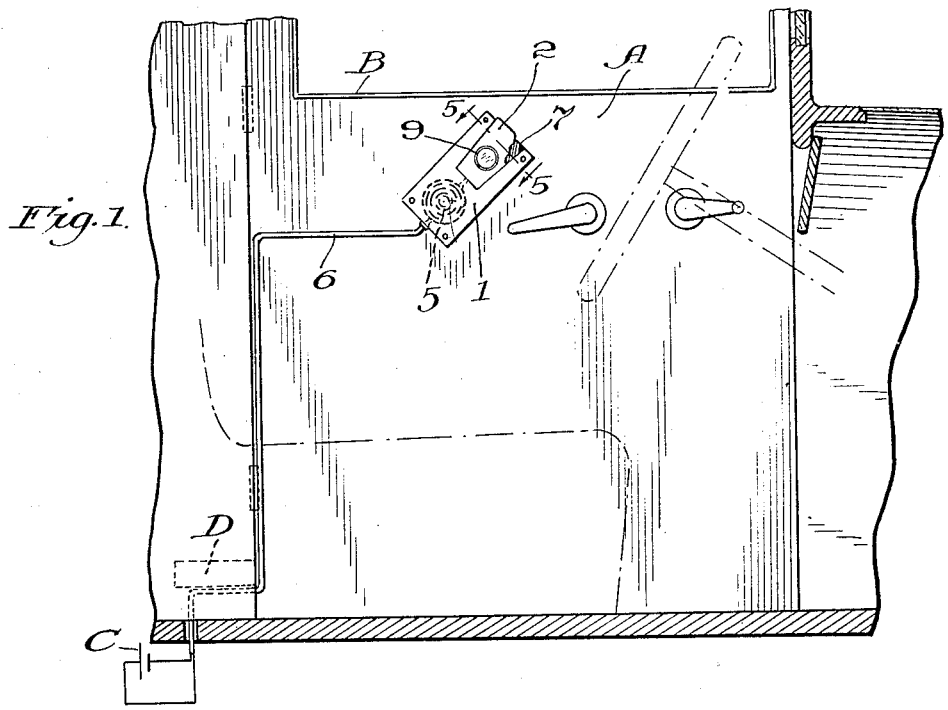
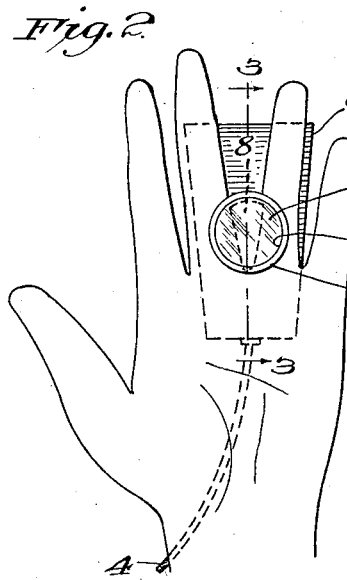
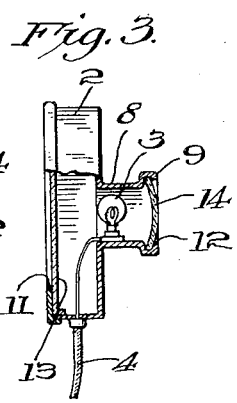
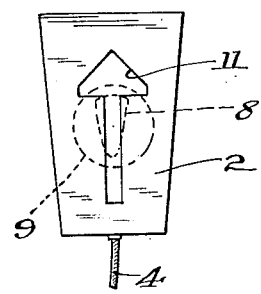
INVENTOR.
Ralph A. Johannessen.
BY R. W. Smith
ATTORNEY.

Patented Oct. 11, 1932

1,881,632

UNITED STATES PATENT OFFICE

RALPH A. JOHANNESSEN, OF LOS ANGELES, CALIFORNIA

DIRECTION INDICATOR

Application filed September 25, 1930. Serial No. 484,301.

This invention is a device adapted for use by the driver of a vehicle for rendering usual arm signals visible at night; and has for its object to provide a signalling element accessible to the driver of a vehicle so as to be conveniently carried outwardly in the hand when giving a usual arm signal, with the signalling element illuminated when so projected in order that the arm signal may be readily seen.

More particularly it is an object of the invention to adapt the signalling element for illumination by a usual electric lamp having a conductor cord which is readily projected or retracted, in order that the signalling device may be carried outwardly in the hand or supported in inoperative position conveniently accessible to the driver, with the electric circuit for the lamp preferably made and broken by projection and retraction of the cord, in order to automatically illuminate the signalling element when operatively projected and extinguish the light when the device is not in use.

It is a further object of the invention to mount the signalling device so that when inoperative it may be conveniently engaged by the fingers and carried outwardly by projection of the driver's arm to signalling position, and to preferably adapt the signalling device for support on the outstretched hand so that the hand and arm may be employed in usual manner for signalling.

It is a still further object of the invention to render the signalling element readily visible from both front and rear when carried by the outstretched hand, and to preferably grip the signalling element so that it always points in the same direction as the driver's hand, with a suitable indicator visibly denoting said direction in order that various signals may be given even though the hand and arm are invisible as a result of darkness.

Further objects of the invention will be readily understood from the following description of the accompanying drawing, in which:

Fig. 1 is a fragmentary section through a vehicle showing the signalling device in inoperative position.

Fig. 2 shows the signalling element in operative position supported by the outstretched hand.

Fig. 3 is a section on the line 2—3 of Fig. 2.

Fig. 4 shows the signalling element, looking in the opposite direction from that of Fig. 2.

Fig. 5 is a transverse section on the line 5—5 of Fig. 1.

The signalling device is particularly adapted for mounting in a motor vehicle, and is shown as a casing 1 mounted on the inside of the door A of an automobile, preferably just below the window B through which the driver's arm is projected when signalling, with a signalling element comprising a shell 2 normally supported in inoperative position by casing 1, and adapted for engagement by the fingers so as to be carried outwardly in the hand when the arm is projected through the window.

The shell 2 carries illuminating means such as a usual electric light bulb 3, and a conductor cord 4 for the lamp extends from shell 2 to the casing 1, and is adapted for retraction within the casing when the signalling device is not in use, or withdrawal from the casing so as to permit the shell 2 being carried outwardly by the hand of the projected arm. For this purpose the cord 3 may be wound on a reel 5 which is mounted in casing 1, and which may be of well known construction adapted for spring rotation so as to normally retract the conductor cord but permitting its ready withdrawal, with projection of the cord preferably automatically closing the electric circuit for lamp 3, and retraction of the cord similarly automatically breaking the circuit. The electric circuit for lamp 3 may include a conductor cord 6 extending from casing 1 to a suitable source of electrical energy, preferably the usual storage battery C of the automobile, and the cord 6 may be carried from the swinging door A to the battery C by mounting the cord on the usual leather strap D which limits the swing of the door and is connected at its respective ends to the door and its frame.

The shell 2 is adapted to slidably fit into casing 1 as shown in Fig. 1, or be supported against the back of the outstretched hand as shown in Fig. 2, and for this purpose is preferably an elongated and somewhat flat structure of slightly tapering width adapted to wedge in a corresponding tapering recess 7 in casing 1 so that when not in use the shell is securely held against displacement, with a shank 8 projecting from the front of the shell and terminating in an enlarged head 9 so that the shank may be readily engaged between the fingers of the hand with the enlarged head abutting against the front of the fingers. The shell may thus be readily withdrawn from casing 1 and securely held against the back of the outstretched hand when the arm is projected to signalling position, and in practice the casing 1 is preferably angularly disposed as shown in Fig. 1, so that normal movement of the hand and arm to signalling position will pass the back of the fingers across the shell 2 in a direction to readily engage shank 8 and slidably withdraw the shell from the casing.

With the shell 2 supported on the back of the outstretched hand as shown in Fig. 2, the light from lamp 3 is preferably visible from both the back and the front of the hand, and for this purpose the shank 8 may be a hollow continuation of shell 2, with lamp 3 mounted in the hollow shank so as to illuminate light apertures 11 and 12 which are provided respectively in the rear face of the shell and at the front of the head 9. The light aperture 11 may be cut in the rear face of shell 2 with a glass plate 13 mounted in the shell and overlying the light aperture, and the light aperture 12 is preferably provided with a usual transparent bulls-eye 14.

The shell 2 is preferably adapted to maintain a predetermined position with relation to the outstretched hand, as for example by making shank 8 of a non-circular cross-section adapted to fit in the V which is formed by the spread fingers as shown in Fig. 2, and the light aperture 11 is preferably a directional indicator, as for example an arrow-shaped opening as shown in Fig. 4, pointing in the direction of the outstretched fingers so that when the hand and arm are shifted to various signalling positions the illuminated arrow 11 will point in the corresponding direction and will thus denote the position to which the arm has been moved so as to indicate the corresponding signal even though the hand and arm are invisible as a result of darkness.

The invention thus provides extremely simple but practical means for visibly displaying usual arm signals at night, with the signalling element normally supported conveniently accessible to the driver of a vehicle and adapted to be carried outwardly in the hand by usual projection of the arm to signalling position. The invention also provides for illuminating the signalling element when projected to operative position, with the illuminated signal supported on the back of the outstretched hand and visible from both front and rear. The invention also provides for maintaining a predetermined position of the signalling device with relation to the outstretched hand, so that an indicator of the signalling device will always point in the direction of the outstretched fingers and thus visibly denote the signalling position to which the hand and arm have been moved, even when the hand and arm are invisible as a result of darkness.

I claim:

1. A signalling element adapted for mounting on the outstretched hand and comprising a shell, a shank projecting from one face of the shell, a laterally projecting head at the outer end of the shank, the shank being adapted for engagement between the outstretched fingers with the fingers received under and abutting against the laterally projecting head and the shell abutting against the opposite side of the fingers, transparent signalling means at the outer face of the head and at the face of the shell which is remote from the fingers, and means in the shell for illuminating the transparent signalling means.

2. A signalling element adapted for mounting on the outstretched hand and comprising a hollow shell, a hollow shank projecting from one face of the shell, a hollow laterally projecting head at the outer end of the shank, the shank being adapted for engagement between the outstretched fingers with the fingers received under and abutting against the laterally projecting head and the shell abutting against the opposite side of the fingers, transparent signalling means at the outer face of the head and at the face of the shell which is remote from the fingers, and an illuminating means mounted in the signalling element so as to project light through both of said transparent signalling means.

3. In combination a supporting element adapted for mounting on the inner surface of a side of a vehicle alongside the hand of the driver, a signalling element comprising a shell having a shank projecting therefrom, and engaging means for detachably mounting the signalling element on the supporting element with the shank of the signalling element projecting horizontally toward the driver for engagement of the shank between the outstretched fingers so that the shell of the signalling element abuts against the back of the fingers, the engaging means providing for displacement of the signalling element from the supporting element by movement of the signalling element at a forward and upward inclination and in a plane perpendicular to its shank.

4. In combination, a supporting element, a signalling element having a shank projecting therefrom, and engaging means for detachably mounting the signalling element on the supporting element with the shank of the signalling element projecting horizontally for engagement between the outstretched fingers so that the shell of the signalling element abuts against the back of the fingers, the engaging means providing for displacement of the signalling element from the supporting element by movement of the signalling element in a plane perpendicular to its shank.

In testimony whereof I have affixed my signature.

RALPH A. JOHANNESSEN.